United States Patent [19]
Allen et al.

[11] Patent Number: 5,251,249
[45] Date of Patent: * Oct. 5, 1993

[54] METHOD OF UPGRADING A CELLULAR NETWORK

[75] Inventors: Daniel L. Allen, McKinney; Lance M. La Bauve, Plano; Aziz A. Meghani, Carrollton, all of Tex.

[73] Assignee: Northern Telecom Limited, Montreal, Canada

[*] Notice: The portion of the term of this patent subsequent to May 4, 2000 has been disclaimed.

[21] Appl. No.: 617,547

[22] Filed: Nov. 26, 1990

[51] Int. Cl.$^5$ .............................................. H04M 11/00
[52] U.S. Cl. ...................................... 379/59; 455/33.1
[58] Field of Search .................... 379/59, 63; 455/33.1, 455/33.2

[56] References Cited
U.S. PATENT DOCUMENTS

| | | | |
|---|---|---|---|
| 4,775,998 | 10/1988 | Felix et al. | 379/59 |
| 4,799,253 | 1/1989 | Stern et al. | 379/59 |
| 4,893,327 | 1/1990 | Stern et al. | 379/59 |
| 5,093,925 | 3/1992 | Chanroo | 455/33 |

OTHER PUBLICATIONS

Cellular One ®, "Personal Rates" brochure, Nov. 1991.
Bell Atlantic Mobile Systems, "Washington Baltimore Cellular Service Area" brochure, Sep. 1992.

Primary Examiner—Jin F. Ng
Assistant Examiner—Dwayne D. Bost
Attorney, Agent, or Firm—Shlesinger, Arkwright & Garvey

[57] ABSTRACT

A method of enhancing an existing cellular network is described such that a new system can operate in tandem with an existing cellular network without disrupting service to existing subscribers and without requiring the replacement of existing equipment. In particular, this is achieved by giving control of all dedicated control channels (CCHs) in each cell to a second switch. The second switch thereby is provided with the control of call set-ups, thus providing for more than one category of mobile subscriber. Some subscribers can be serviced by the existing switch and others by the second switch.

4 Claims, 5 Drawing Sheets

METHOD OF UPGRADING A CELLULAR NETWORK

FIELD OF THE INVENTION

The present invention relates to cellular radiotelephone systems and more particularly to a method and apparatus for allowing a new network with enhanced services to co-exist with an existing cellular network.

BACKGROUND OF THE INVENTION

Today's cellular networks are single-vendor systems with proprietary switch/cell-site interfaces that constrain network operators to grow by purchasing equipment from the same vendor that provided their initial equipment.

With dual-vendor capability, network operators can flexibly provide enhanced services by having the original vendor upgrade the existing system or by having another vendor install a new system which is phased in with the existing system.

Since the interface of a base station to a Mobile Telephone Switching Office (MTSO) is proprietary to that vendor, the introduction of a new network by another vendor often requires the installation of all new base stations and switching offices. Cellular network operators in major service areas are reluctant to completely replace their existing vendor's equipment with a new vendor's equipment. The network operators can perceive that a complete replacement would be too costly and too risky to undertake. Further, their system would remain a single vendor network. In order to make the transition as cost effective as possible, the new system must therefore operate in tandem with the old system. This is accomplished by having the new network overlay the old one.

However, since the two networks are incompatible, some problems can arise with call handling between subscribers. Each switching office will often have to handle calls according to the source, destination of each call and of course, the type of subscriber. As the cellular business matures, enhanced services will be more commonly available, and thus two types of subscribers can be identified in the network. Subscribers can be divided into premium or non-premium. The terms are used to differentiate between, for example, centrex integrated subscribers and subscribers to basic only cellular service. In this instance, basic and analog cellular subscribers are referred as non-premium, whereas centrex subscribers are referred to as premium subscribers. Thus, if a call originates from a non-premium subscriber, it is processed by the original switch.

Similarly, if a call is directed to a non-premium subscriber, the call is still processed by the original switch. However, if a call originates from a premium subscriber, it will be handled by the new switch.

Thus, if a new vendor equipment is to co-exist with the original vendor's equipment, subscribers must perceive no significant reduction in service quality or availability and cellular network operators must not be required to replace undepreciated capital equipment where it can be avoided.

There is accordingly a need for a system and a method for enhancing an existing cellular network such that a new system can operate in tandem with an existing cellular network without disrupting service to existing subscribers and without requiring the replacement of existing equipment.

SUMMARY OF THE INVENTION

The present invention provides to a service provider or network operator an ability to improve a cellular network without disrupting existing service. In particular, this is achieved by giving control of all dedicated control channels (CC) in each cell to a second switch. The second switch thereby is provided with the control of call set-ups, thus providing for more than one category of mobile subscriber.

Accordingly, it is an object of the present invention to provide to a network operator a method of operating a new cellular system in tandem with an existing system without disrupting service to existing subscribers.

Another object of the present invention is to provide a method of introducing a new cellular system in tandem with an existing system which will not require the replacement of existing equipment.

It is therefore an aspect of the present invention to provide a method of upgrading a cellular network having a plurality of cells with at least one base station in each cell and a mobile telephone switching office (MTSO) connected to a public network (PSTN), said MTSO servicing a first group of subscribers, comprising the steps of:

a) decoupling in and out trunks between said MTSO and said PSTN;

b) coupling in and out trunks between said PSTN and a second switching office (SSO);

c) coupling inter-office trunks from said SSO to said MTSO, and from said MTSO to said SSO;

d) placing, in each cell, base stations associated with said SSO with each base station associated with said MTSO; and e) assigning for each cell a paging/access control channel associated with said SSO such that call set-up for said first and second group of subscribers is controlled by said SSO.

Another aspect of the present invention is to provide a method of upgrading a cellular network having a plurality of cells with at least one base station in each cell and a mobile telephone switching office (MTSO) connected to a public network (PSTN), said MTSO servicing a first group of subscribers, comprising the steps of:

a) decoupling incoming trunks from said PSTN to said MTSO;

b) coupling in and out trunks between said PSTN and a second switching office (SSO);

c) coupling inter-office trunks from said SSO to said MTSO, and from said MTSO to said SSO;

d) placing, in each cell, base stations associated with said SSO with each base station associated with said MTSO;

e) assigning for each cell associated with said MTSO, a modified paging/access control channel; and f) assigning for each cell a paging/access control channel associated with said SSO such that call set-up for said first and second group of subscribers is controlled by said SSO.

DETAILED DESCRIPTION OF THE PREFERRED EMBODIMENT

Figure 1:
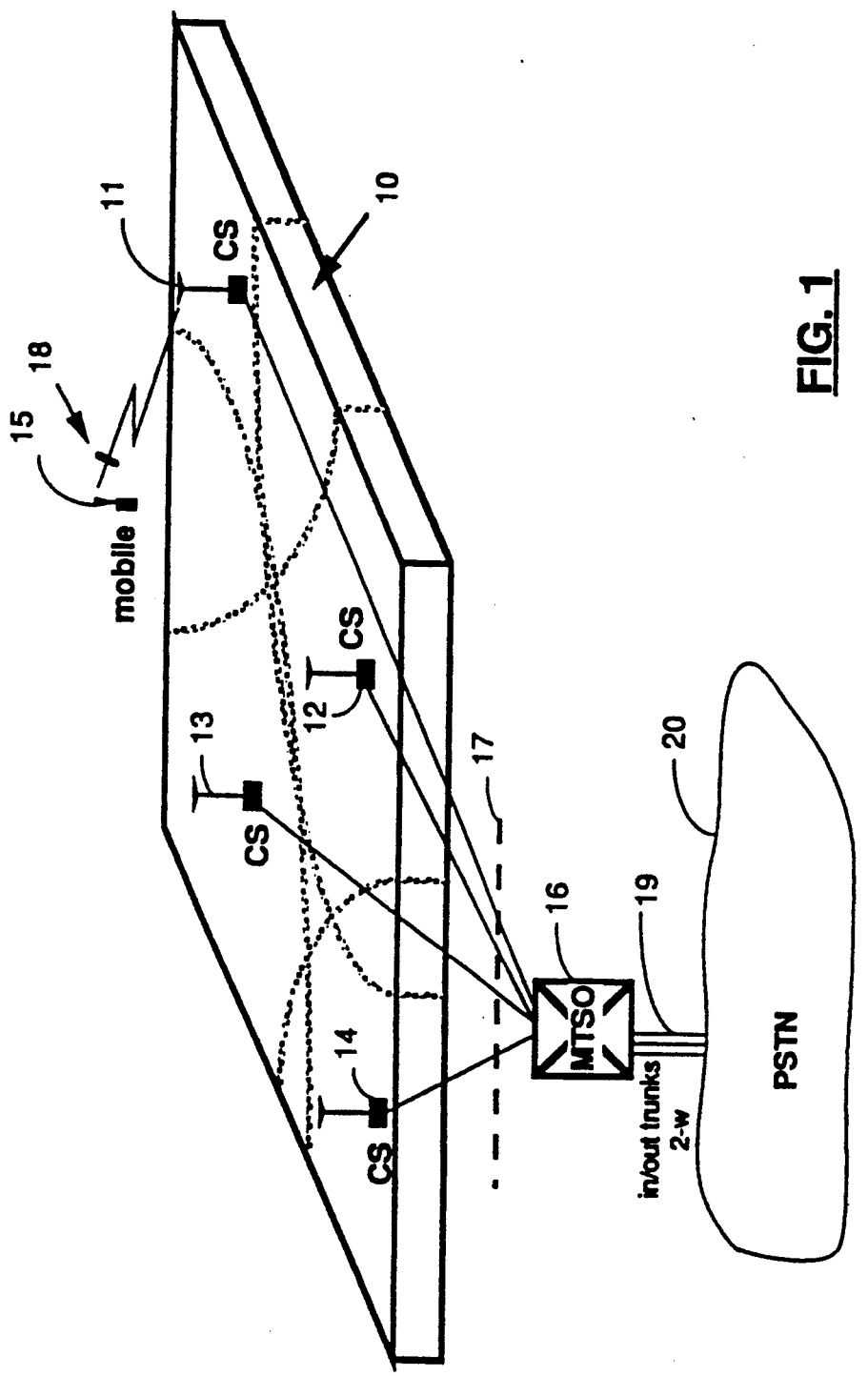
FIG. 1 is an illustration of an existing single vendor cellular network.

Referring now to FIG. 1, we have shown a cellular serving area 10, which provide a cellular service by means of a number of cell sites 11, 12, 13 and 14, which are located at various locations in serving area 10 according to the need of the service or network operator. Communication between a mobile subscriber 15 and the Mobile Telephone Switching Office (MTSO) 16 is done using one of the cell sites located near the subscriber. The interface 17 between the MTSO 16 and each cell-site is a proprietary interface, i.e. which operates on a protocol usable only with that vendor's equipment. The RF link 18 between mobile subscriber 15 and cell site 11 consist of the EIA-553 protocol which has been adopted as a standard for analog cellular networks or the IS-54 dual-mode standard. In and out trunks 19 are used to connect the MTSO 16 to the Public Switched Telephone Network (PSTN) 20. With this type of network architecture, the cellular network operator is limited to a single vendor for increasing the capacity of the network or providing enhanced services.

Figure 2:
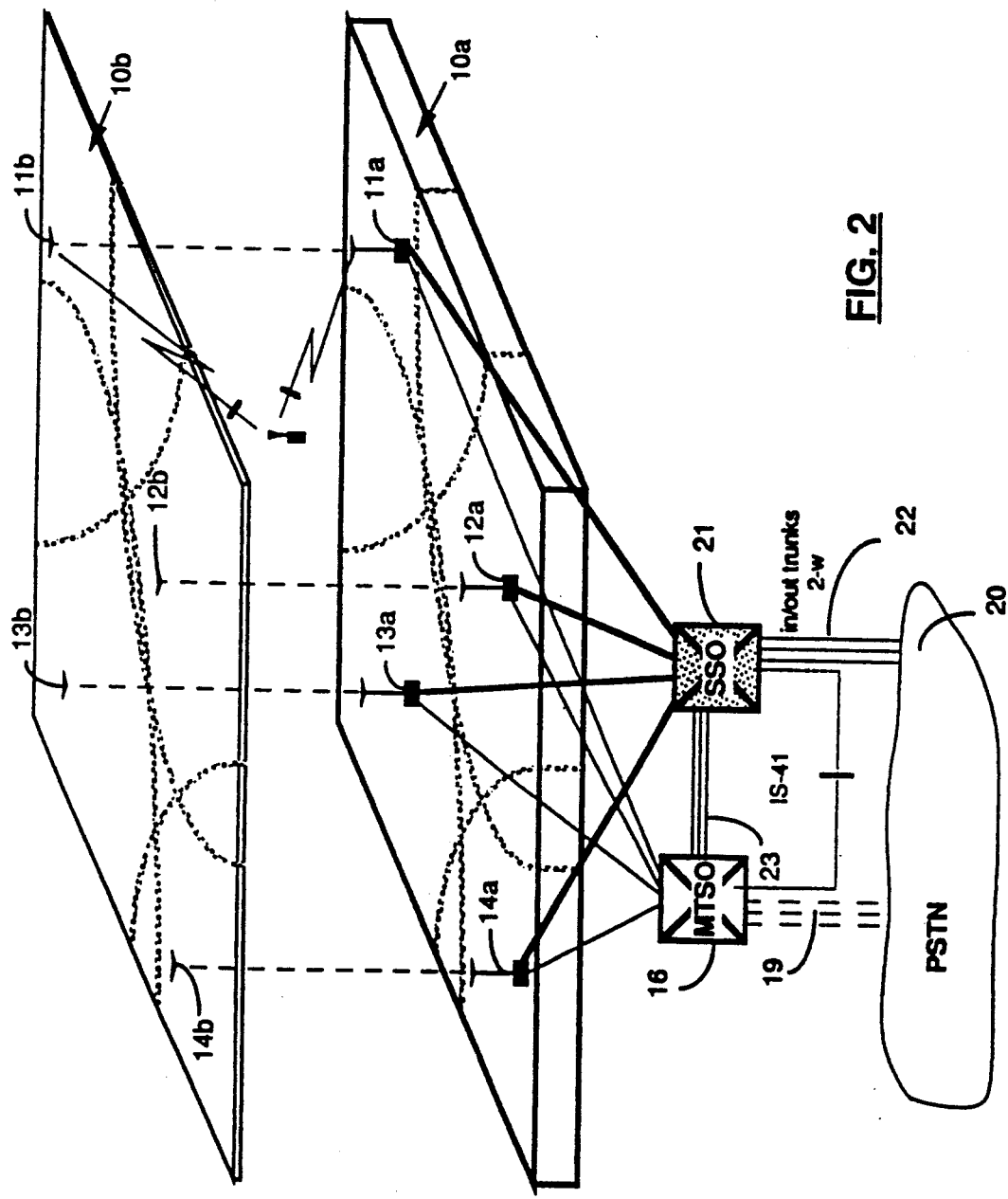
FIG. 2 is an illustration of a multi-vendor cellular network according to a first embodiment of the present invention.

In the illustration of FIG. 2, a new vendor can provide additional or enhanced services to the existing network 10a with an overlay network 10b, by placing a Second Switching Office (SSO) 21 in control of the dedicated control channels (CCHs) in each cell, thereby, giving the SSO control of call set-ups. The MTSO retains most of the voice channels (VCHs). The SSO is assigned a few VCHs and the control channels (CCHs). This is accomplished by decoupling in/out trunks 19 of the MTSO 16 and coupling in/out trunks 22 from the SSO 21 to the PSTN 20. A number of inter-office trunks 23 are coupled from the SSO 21 to the MTSO 16 and from the MTSO 16 to the SSO 21. Each cell site base station 11a, 12a, 13a and 14a associated with the MTSO 16 is provided with second base stations 11b, 12b, 13b and 14b associated with the SSO 21. With this arrangement, wherein the CCHs are in the overlay network 10b, the SSO 21 controls the system by controlling the voice channel access by the mobiles.

Figure 4:
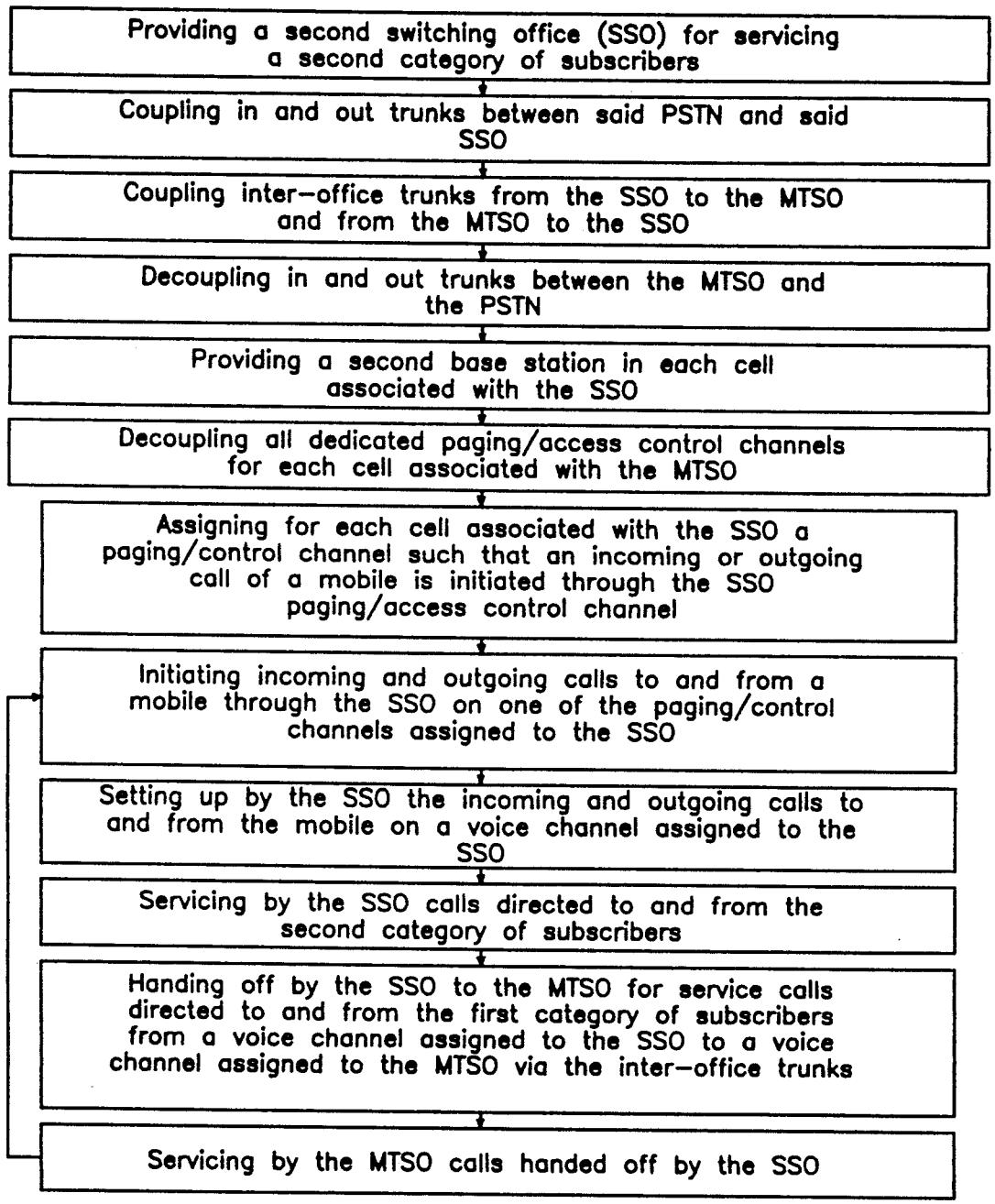
FIG. 4 is a schematic flow chart of a method for upgrading an existing cellular network in accordance with a first embodiment of the present invention.

In operation, any call to or from a mobile is initiated via signalling on the CCHs assigned to the SSO 21. The SSO 21 sets up and initially services all calls. For each call, the SSO decides whether to continue servicing the call or to hand "down" the call to the MTSO 16 via the interoffice trunks 23. For example, one criterion that could be used for hand "down" could be that any subscriber that has not subscribed to a premium service would be handed down for service by the MTSO 16. The industry standard for intersystem handoff (IS-41) is the basis for these hand "downs". Interim Standard 41 is the Cellular Radio Telecommunication Intersystem Operation Standard. The operation is best shown in FIG. 4.

Figure 3:
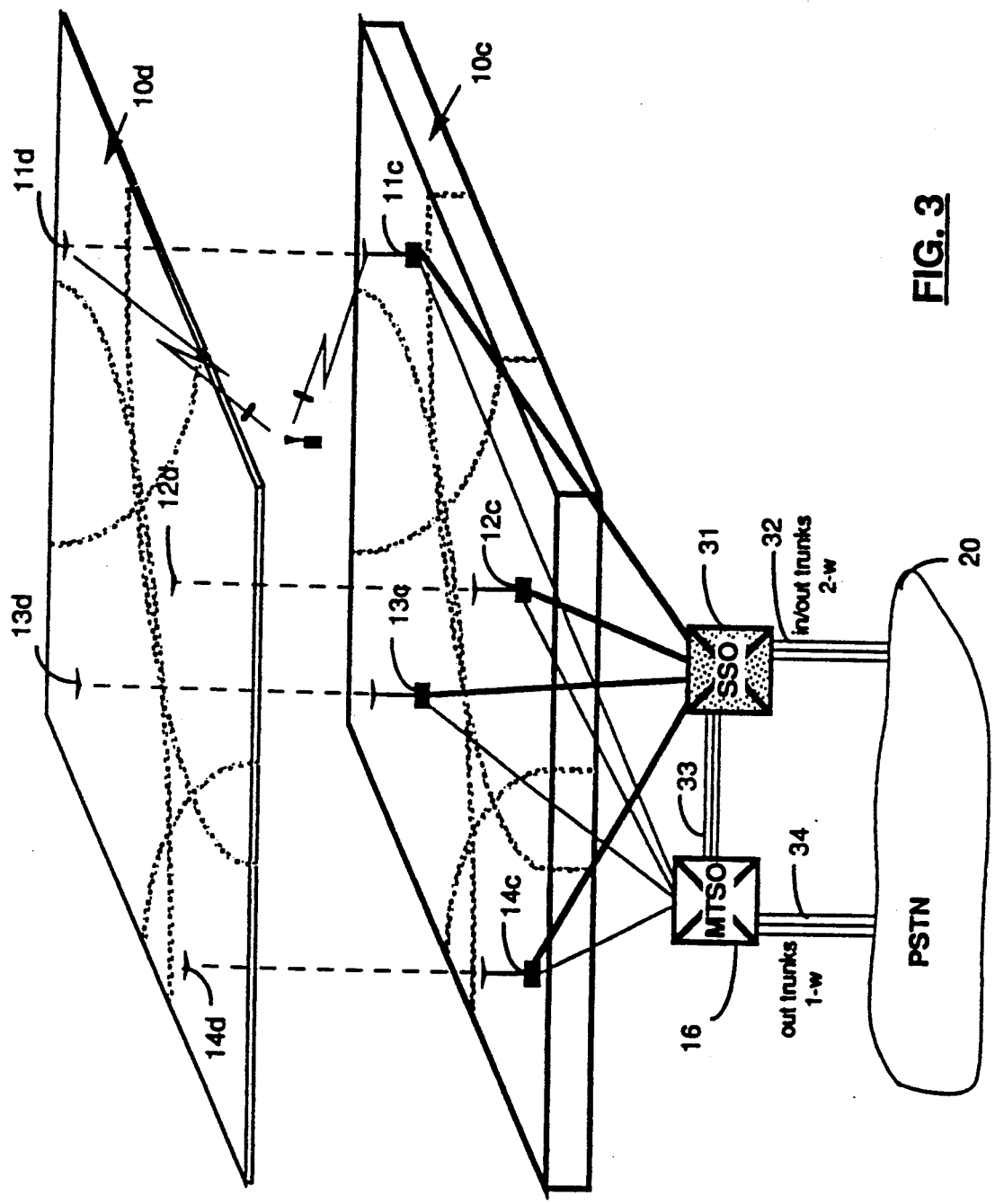
FIG. 3 is an illustration of a multi-vendor cellular network according to a second embodiment of the present invention.

In the illustration of FIG. 3, a new vendor can similarly provide additional or enhanced services to the existing network 10c with an overlay network 10d, by placing a Second Switching Office (SSO) 31 in control of the dedicated control channels (CCHs) in each cell, thereby, giving the SSO control of call set-ups. This is accomplished by decoupling the in trunk of the MTSO 16 and coupling only the out trunk 34 from the MTSO 16 to the PSTN. In/out trunks 32 from the SSO 31 are coupled to the PSTN 20. A number of inter-office trunks 33 are coupled from the SSO 31 to the MTSO 16 and from the MTSO 16 to the SSO 31. Each cell site base station 11c, 12c, 13c and 14c associated with the MTSO 16 is provided with a second group of base stations 11d, 12d, 13d and 14d associated with the SSO 31. With this arrangement, wherein the CCHs are in the overlay network 10d, the SSO 31 controls the system by controlling the voice channel access by the mobiles. The paging/access channel of the MTSO is set up either by removing the paging channel or by disabling that channel, such that only the access channel is in operation. In effect, the CCH of the MTSO are arranged such that no mobile will scan and lock onto any of paging channels of the MTSO to monitor for paging messages. This requirement can be met by setting the CCHs as described above, by provisioning the MTSO's access-only channels outside the dedicated 21 control channels or by provisioning the CCHs such that they are "mistuned" to operate on appropriate frequencies. Thus, the MTSO would operate what it believes were combined page/access control channels in the dedicated 21 CCHs in a way that all mobiles in the system would see as access-only CCHs.

In operation, the subscribers are divided into a set to be serviced by the SSO 31 and a set to be serviced by the MTSO 16. For example, calls from mobiles can originate either from a premium or a non-premium subscriber. When premium subscribers attempt to originate calls, the SSO 31 handles the call set-up on the dedicated CCHs and then services the call on its set of voice channels (VCHs). The SSO's VCs and the dedicated CCHs would be monitored by base stations 11d, 12d, 13d and 14d. When non-premium subscribers attempt to originate calls, the SSO intercepts the attempts on the dedicated CCHs, which as indicated above are now assigned to the SSO 31 from the MTSO 16, and sends back a "Directed retry" message on the dedicated CCH which causes the non-premium subscriber to re-attempt access, but this time on an access-only CCH controlled by the MTSO 16. The subscriber unit can re-attempt access by being instructed to retune to the particular CCH assigned to the MTSO. The MTSO then sets up and services these calls.

Figure 5:
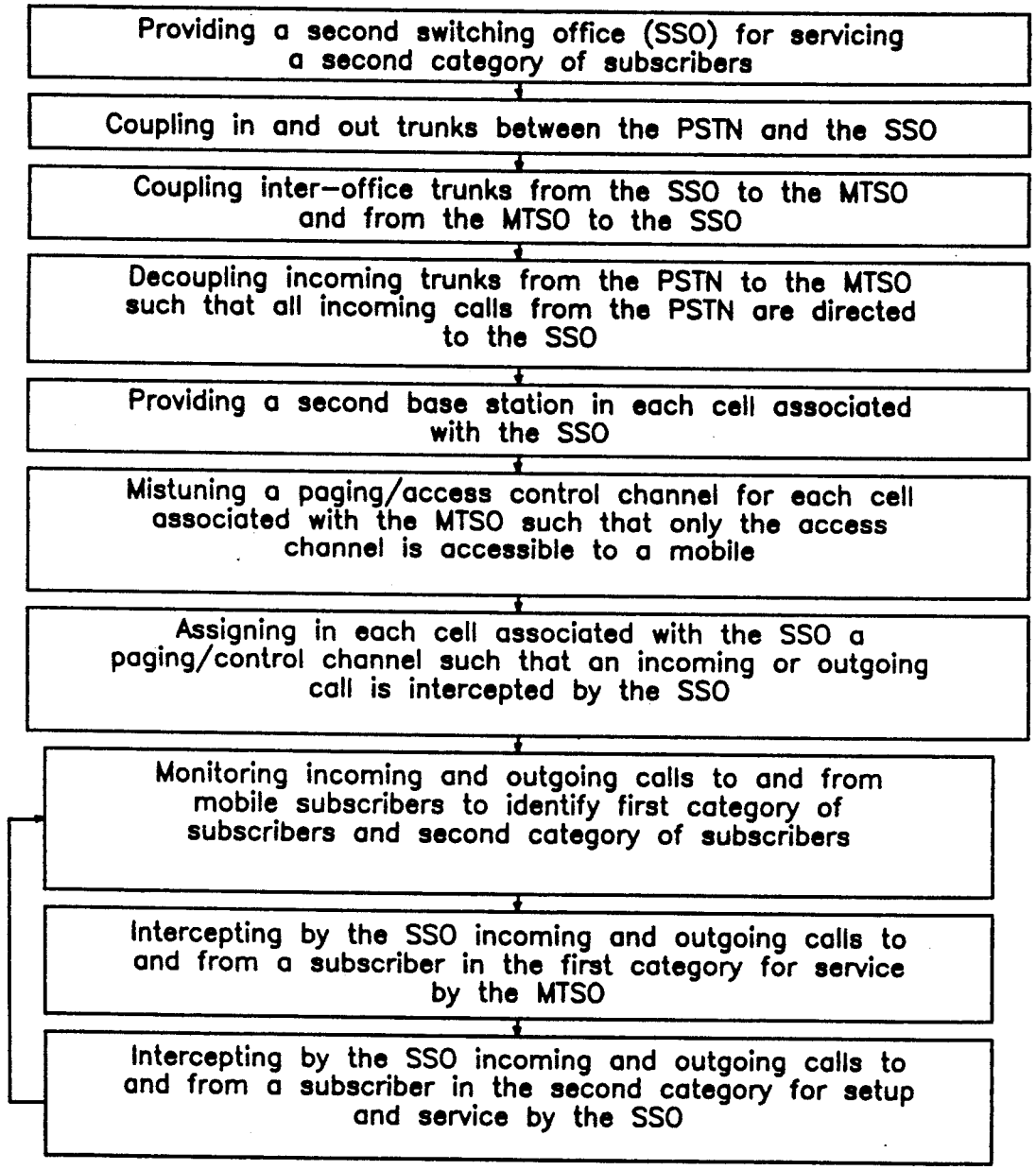
FIG. 5 is a schematic flow chart of a method for upgrading an existing cellular network in accordance with a second embodiment of the present invention.

Incoming calls to a cellular subscriber (premium and non-premium) arrive from the PSTN at the SSO 31. Calls to premium subscribers are set-up by the SSO and serviced on one of the SSO's VCHs. Calls to non-premium subscribers are set-up by the SSO 31 and handed down to the MTSO 16 as follows. When the call to the non-premium subscriber reaches the SSO, the SSO simultaneously pages the called non-premium subscriber on its dedicated CCH and forwards the incoming call to the MTSO 16 via the interoffice trunks 33. The non-premium subscriber receiving the page message on the SSO's CCH responds to the SSO. At that time, the SSO instructs the non-premium subscriber to retry its page response access attempt on the access-only CCHs controlled by the MTSO 16. During this directed retry attempt by the non-premium subscriber, the MTSO has received the forwarded incoming call and has gone through its internal paging process and "sends out" a page message on the above mentioned "missing" or "mistuned" paging channel to the non-premium subscriber. When the subscriber's page response is received at the MTSO, which is really in response to the SSO's paging message, the MTSO proceeds to set up the call. Thus, the MTSO operates as before the upgrade, that is, as if it had control of the call set-up and service. The subscriber does not see any degradation in service and does not know whether calls are handled by the MTSO or the SSO. The above described operation is depicted in FIG. 5.

We claim:

1. A method for providing an overlay cellular network and operating in tandem said overlay cellular network with an existing cellular network to upgrade said existing network's capacity and service, said existing network having a plurality of cells with at least a first base station in each cell connected to a mobile telephone switching office (MTSO) connected to a public switched telephone network (PSTN), said MTSO having paging/access control channels, said MTSO servicing a first category of subscribers having basic cellular service, said method comprising the steps of:
  a) providing a second switching office (SSO) for servicing a second category of subscribers having premium cellular service, said SSO having paging/access control channels;
  b) coupling in and out trunks between said PSTN and said SSO;
  c) coupling inter-office trunks from said SSO to said MTSO and from said MTSO to said SSO;
  d) decoupling in and out trunks between said MTSO and said PSTN;
  e) providing a second base station in each cell, said second base station being associated with said SSO;
  f) decoupling all dedicated paging/access control channels for each cell associated with said MTSO;
  g) assigning for each cell associated with said SSO a paging/control channel such that an incoming or outgoing call of a mobile is initiated through said SSO paging/access control channel;
  h) initiating incoming and outgoing calls to and from a mobile through said SSO on one of said paging/control channels assigned to said SSO;
  i) setting up by said SSO said incoming and outgoing calls to and from said mobile on a voice channel assigned to said SSO;
  j) servicing by said SSO calls directed to and from said second category of subscribers;
  k) handing off by said SSO to said MTSO for service calls directed to and from said first category of subscribers from a voice channel assigned to said SSO to a voice channel assigned to said MTSO via said inter-office trunks; and
  l) servicing by said MTSO calls handed off by said SSO.

2. A method as in claim 1, wherein:
  a) said step k) is implemented using an IS-41 intersystem handoff.

3. A method for providing an overlay cellular network and operating in tandem said overlay cellular network with an existing cellular network to upgrade said existing network's capacity and service, said existing network having a plurality of cells with at least a first base station in each cell connected to a mobile telephone switching office (MTSO) connected to a public switched telephone network (PSTN), said MTSO having paging/access control channels, said MTSO servicing a first category of subscribers having basic cellular service, said method comprising the steps of:
  a) providing a second switching office (SSO) for servicing a second category of subscribers having premium cellular service, said SSO having paging/access control channels;
  b) coupling in and out trunks between said PSTN and said SSO;
  c) coupling inter-office trunks from said SSO to said MTSO and from said MTSO to said SSO;
  d) decoupling incoming trunks from said PSTN to said MTSO such that all incoming calls from said PSTN are directed to said SSO;
  e) providing a second base station in each cell, said second base station being associated with said SSO;
  f) providing a modified paging/access control channel for each cell associated with said MTSO such that only the access channel is accessible to a mobile;
  g) assigning in each cell associated with said SSO a paging/control channel such that an incoming or outgoing call to and from a first category subscriber is intercepted by said SSO and transferred for service to said MTSO and an incoming or outgoing call to and from a second category subscriber is set up and serviced by said SSO;
  h) identifying by said SSO a call from said PSTN as being directed to a subscriber in said first category;
  i) capturing said call;
  j) sending a paging signal to the called subscriber on a paging/access control channel assigned to said SSO;
  k) simultaneously forwarding the captured incoming call to said MTSO along said inter-office trunks;
  l) receiving by said SSO a paging response signal from the called subscriber on said paging/access control channel associated with said SSO;
  m) sending a page response retry message to the called subscriber to retry a page response on said modified paging/access control channel assigned to said MTSO;
  n) receiving by MTSO said captured incoming call from said SSO through said interoffice trunks;
  o) sending by said MTSO a paging signal to the called subscriber on said modified paging/access control channel;
  p) receiving by said MTSO the retried page response from the called subscriber on said modified paging/access control channel; and
  q) servicing the call from said PSTN on a voice channel assigned to said MTSO.

4. A method as in claim 3, wherein:
  a) said step f) is implemented by provisioning said paging/access control channels associated with said MTSO such that they operate in frequencies outside of their originally dedicated frequencies.

* * * * *

UNITED STATES PATENT AND TRADEMARK OFFICE
CERTIFICATE OF CORRECTION

PATENT NO. : 5,251,249
DATED : October 5, 1993
INVENTOR(S) : Allen, et al.

It is certified that error appears in the above-indentified patent and that said Letters Patent is hereby corrected as shown below:

Title page, left column, at [*] Notice:
    Change "May 4, 2000" to -- February 25, 2011 --.

Signed and Sealed this

Ninth Day of September, 1997

Attest:

BRUCE LEHMAN

Attesting Officer      Commissioner of Patents and Trademarks